United States Patent [19]

Nakajima

[11] Patent Number: 5,236,656
[45] Date of Patent: Aug. 17, 1993

[54] METHOD OF INJECTION BLOW MOLDING SYNTHETIC RESIN BELLOWS PRODUCT

[75] Inventor: Masayuki Nakajima, Fujisawa, Japan
[73] Assignee: Keeper Co., Ltd., Tokyo, Japan
[21] Appl. No.: 761,514
[22] Filed: Sep. 18, 1991
[30] Foreign Application Priority Data
Sep. 29, 1990 [JP] Japan ................... 2-262239
[51] Int. Cl.⁵ .............. B29C 49/06; B29C 49/36
[52] U.S. Cl. ................... 264/506; 264/537; 264/538; 425/533
[58] Field of Search ........... 264/506, 507, 508, 537, 264/538, DIG. 52; 425/533

[56] References Cited
U.S. PATENT DOCUMENTS
3,594,463 7/1971 Hestehave ................. 264/538
FOREIGN PATENT DOCUMENTS
228720 10/1985 Fed. Rep. of Germany ...... 264/508
2-34211 8/1988 Japan.
88/06088 8/1988 World Int. Prop. O. .......... 264/506

Primary Examiner—Catherine Timm
Attorney, Agent, or Firm—Notaro & Michalos

[57] ABSTRACT

A method of injection blow molding a synthetic resin bellows product having root portions and crest portions, each of which has the axially sectional form of a circular arc, and incline portions therebetween, for example, a plastic bellows product such as a constant-velocity joint boot, a steering boot or the like. The method is capable of molding a product having a thickness uniform throughout, and particularly, root portions having little dimensional variations. The method involves firstly molding the parison root portions or the root portions plus their adjacent areas into substantially the same shape as those of a final product by injection molding during molding of a parison, and then blow molding only the crest portions and the incline portions to obtain the shape of the final product.

11 Claims, 4 Drawing Sheets

METHOD OF INJECTION BLOW MOLDING SYNTHETIC RESIN BELLOWS PRODUCT

BACKGROUND OF THE INVENTION

1. Field of the Invention

The present invention relates to a method of injection blow molding synthetic resin bellows products. Particularly, the invention relates to a method of injection blow molding plastic bellows products such as constant-velocity joint boots, steering boots and the like.

2. Technical Terms

The term, "ratio of parison" or "parison ratio", throughout the specification and claims is defined by the formula: $\{(D-A)/(D-d)\} \times 100$, wherein "D" is a diameter of the crest portion of the product, "d" is a diameter of the root portion of the same product, and "A" is an outer diameter of the parison. The outer diameter of the parison refers to an outer diameter of the parison crest portion, since in the present invention the crest portion of the parison (including a crest incline portion) is solely subject to blow molding.

3. Description of Related Art

Hitherto, a blow molding method has been utilized frequently for forming a synthetic resin material into a bellows product. However, it has been found that, in the course of blowing up the base material in the bellows-shaped mold, the crest portions of the bellows product to be formed are blown up at a high ratio as against the root portions of same, resulting thus in extreme reduction of crest portions in thickness in contrast to a general thickness of the resultant bellows product as a whole. For example, if the thus-formed bellows product is an actuator, it will be the case that, in a practical operation of the actuator, a negative pressure applied thereto buckles its crest portions which are thin for the above reason, as a result of which the actuator's expanding/contracting action strokes are reduced, or what is worse, the product will not function as an operable actuator. Further, where the product is used as a duct for an air conditioner, such thin crest portions will reduce the thermal insulation property of the duct.

A solution to these problems could be thought to be by providing an increased thickness of the parison to compensate for the thin crest portions of the bellows product, but other portions than the crest portions will be increased in thickness more than normally required. Thus, the base material will be wasted in fact and may not be used economically. In addition, the resultant product will lose the original elastic property of bellows.

Another solution could be assumed by using an injection blow molding method to form the bellows product. In the injection blow molding method, a molten resin is injected into a mold to form a tube-like bottomed parison which is then expanded while being surrounded by a blowing mold to form a product having a final shape. Thus, the material used encounters such antinomic aspect: In the injection process, it should preferably be low in viscosity with good fluidity, while by contrast, in the blowing process, it should preferably be high in viscosity. Normally the material used is selected in preference to the blowing process, and therefore will not easily flow during the injection molding. It is thus common practice to form the parison into a tube-like shape having a uniform thickness and low flow resistance. The parison is entirely expanded along a bellows-like cavity formed in a blow molding outer mold to form a bellows-like barrel portion.

However, when a bellows product is formed by using such a tube-like parison having a uniform thickness, the blow-up ratio in the crest portions is locally different from that of the root portions, and a product with large variations in the thickness is finally obtained.

Particularly, with regard to a conical bellows product, such as a constant-velocity joint boot used in an automobile, in which its crest and root portions gradually increase in diameter as they proceed toward one end of the product, one can contemplate making the thickness uniform of the resultant product by forming a parison into a tapered shaft and widening the dimensions of the product progressively toward its one end. This becomes similar to open pressure molding, however, thus resulting in bubble creation through gas components in the resin used, or resulting in an intricate flow for the parison, so that internal resistance may easily remain in the parison. Consequently, problems occur such as sink marks, bubbles and voids in the parison per se. Even if one suggests forging an elongated bellows product, the molding will still be close to open pressure molding, which therefore raises the same problems such as sink marks, bubbles and voids in a parison. For these reasons, the injection blow molding method has been deemed incapable of forming a bellows product of uniform thickness, especially of forming a conical bellows product whose diameter becomes greater as it proceeds to one end of the product.

Those problems yet to be solved as to non-uniform thickness may seemingly be addressed by a technique for making the thickness of the parison itself non-uniform, which is proposed in the Japanese Utility Model Laid-Open Pub. No. 2-34211. But, such mere control of parison thickness has still encountered difficulty for molding a product with uniform thickness, in view of the blow molding process involving the steps of expanding a parison while reducing its thickness to obtain a desired shape of product, which tends to cause non-uniformity in distribution of blowing pressures, or changes in temperature of resin used, etc., thus resulting in forming a resultant product with non-uniform thickness. The same difficulty is even amplified for an intricate shape of bellows products, in particular, for a constant-velocity joint boot having conical bellows, which is asymmetric in the angles of the inclined portions connecting the crest and root portions in its axial direction, which makes it difficult to uniformly expand the parison and thus non-uniformity will easily occur in its thickness. Further, an occurrence of such thickness non-uniformity in the root portions of the bellow product makes it unsuitable for the present particular molding method to the constant-velocity joint boot for automobiles.

Additionally, one can consider rendering the parison non-uniform, using a constant ratio among the crest, root and inclined portions, but even in such case, the parison ratio is still high and as such it is difficult to calculate its volume, as a result of which, if any volume error of the product is increased, the core of the product will require correction to compensate for the error.

SUMMARY OF THE INVENTION

It is an object of the present invention to provide an injection blow molding method by which a plastic bellows product having a uniform thickness is simply obtained. Particularly, it is an object of the present invention to provide the injection blow molding method which permits the forming of a resultant plastic bellows product having a thickness which is uniform throughout and, particularly, with its crest portions having little dimensional variations.

In order to achieve the object, the present invention provides a method of injection blow molding a synthetic resin product into a synthetic resin bellows product having a bellows-like barrel portion comprising crest portions, root portions with an axially sectional circular arc form, and incline portions defined therebetween. The method comprises the steps of effecting an injection molding by use of an injection molding mold to mold therein a parison of molten synthetic resin material into a shape having root portions or root portions plus their adjacent areas generally identical to those of the resultant bellows product, and thereafter effecting a blow molding by use of a blow molding mold to only mold crest portions and incline portions of the parison into shapes identical to those of the resultant bellows product, thereby obtaining a predetermined shape of the product.

In the injection blow molding method of the present invention, it is preferable that the outer peripheral side of each crest portion of the parison is formed into a plane shape or a rounded shape, and the inner peripheral side thereof is formed into a plane shape or rounded shape. The present invention is preferably applied to a bellows product having a substantially conical shape in which, at its barrel portion, the crest and root portions are gradually increased in diameter as they proceed down to one end of the product.

During the injection molding steps, only the root portions of the parison are correctly formed into a shape identical to those of the final product. Excepting the root portions or the root portions and their adjacent areas, the crest portions and incline portions ar then formed by the next blow molding steps into the dimensions of the final product. During the blow molding, the blow air is caused to flow into each of the parison crest portions for expansion, to an extent which does not affect the dimensional accuracy of the root portions, applying blow pressure to each crest portion. At this moment, the blow air penetrates through each elastic layer of the parison root portions, expanding it slightly, and thus the parison root portions are expanded for extremely short time with blow pressure. Accordingly the root portions are substantially not subjected to blow molding.

The present invention has for another object the provision of such particular steps to blow mold the parison crest and incline portions only, excepting the root portions. To this end, according to the invention, there is provided a method which includes using a core mold commonly for both of the injection molding mold and blow molding mold, wherein the injection molding is effected through a cavity defined by a cavity surface of the core mold and that of the injection molding mold, the cavity including cavity points corresponding respectively to the root portions or root portions plus their adjacent areas of the resultant bellows product, so that the root portions of the parison or the root portions plus their adjacent areas of the parison are injection molded into shapes generally identical to those of the resultant bellows product, and wherein the blow molding is effected through a cavity defined by the cavity surface of the core mold and that of the blow molding mold, the cavity including cavity points corresponding respectively to the crest and incline portions of the resultant bellows product, such that, at each of the cavity points, a blow molding hollow is created between the core and blow molding molds, in which blow molding hollow, the parison crest and incline portions are only blow molded into shapes identical to those of the resultant bellows product, whereas, during the blow molding, at other cavity points corresponding respectively to the root portions of the resultant product, the parison root portions are held substantially with the same shape as those having thus been injection molded, without being subject to the blow molding. Preferably, it may be arranged that such other cavity points between the core and blow molding molds, which correspond respectively to the parison root portions, are formed with a slight allowance in relation to the corresponding cavity points defined in the injection molding, whereby blow air is allowed to pass through an elastic layer of the parison at each of the other cavity points, without carrying out the blow molding therein. Accordingly, only the root portions of the parison are correctly molded into the final shape by injection molding during molding of the parison, and the crest portions and incline portions are then blow molded into the shape of the final product. In this way it is possible to prevent dimensional variations of the crest portions as found in forming bellows product. In addition, the parison ratio, among the root, crest and incline portions can be varied. Particularly, the parison ratio at the crest and incline portions may be set at 20% to 80%, preferably about 50%. This makes it easier to calculate the volume of the parison for molding, and reduces error in such parison volume with respect to the product shape whereby dimensional variations are avoided in those crest and incline portions. The whole bellow portions can thus be molded with a uniform thickness, eliminating the need for correcting the core mold.

Further, when each crest portion is formed into a plane shape, it is possible to easily process the mold used for injection molding and easily calculate the material distribution, and the crest portions can thus be molded with a thickness which is uniform throughout by uniform expansion during blow molding. Alternatively, if each of the crest portions is formed into a rounded shape, the stress of the parison can be uniformly distributed during blow molding, and this contributes to the uniformity in thickness.

DETAILED DESCRIPTION OF PREFERRED EMBODIMENTS

Figure 1A:
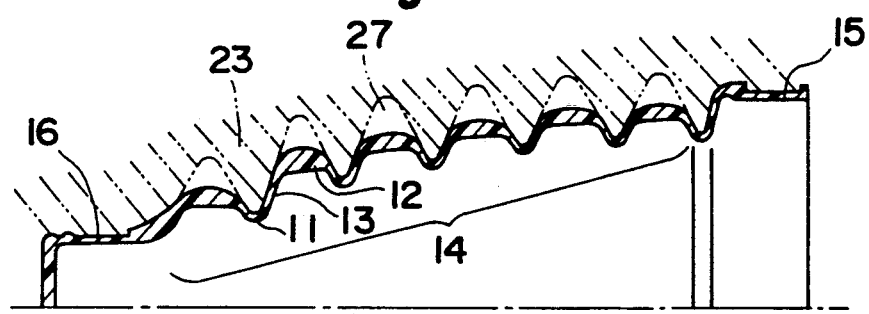
FIG. 1A is a longitudinally sectional view showing an example of molds wherein one half split molds and parison in injection blow molding are shown for molding a synthetic resin bellows product, in accordance with the present invention.

Hereinafter, the construction of the present invention will be described in detail, with reference to the embodiments shown in the drawings. The embodiments are shown as being applied to a constant-velocity joint boot used in automobiles.

Figure 2A:
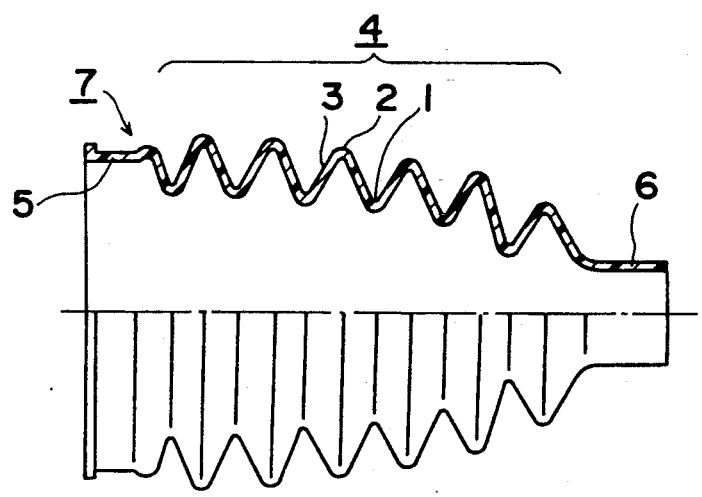
FIG. 2A is a longitudinally sectional view taken along the central line, showing an example of bellows products to be molded by the method of the present invention.
Figure 2B:
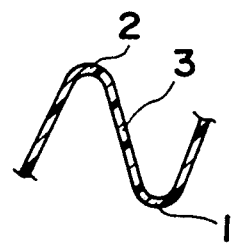
FIG. 2B is an enlarged axially sectional view of a bellows portion.

Firstly, a brief explanation will be made of such constant-velocity joint boots, i.e. a resulting product to be formed from a synthetic resin material. Referring now to FIG. 2A, designation 7 represents the joint boot of this kind, which comprises basically root portions 1 and crest portions 2, each being depicted as having an axially sectional circular arc shape, and incline portions 3 defined therebetween. The root and crest portions 1, 2 are defined in a bellows-like barrel part 4 of the boot 7, and at both ends of barrel part 4, there are provided cylindrical mounting portions 5, 6, respectively. Though not shown, the mounting portions 5, 6 are fixedly mounted to suitable parts of the joint. As will be described later, the formation of this particular boot 7 is effected by an injection blow molding method which is distinctive in accordance with the present invention, of which the steps, in summary, involve forming a parison during injection molding into such shape having root portions generally identical to those at 1 of the resultant product 7 or having root portions plus adjacent areas generally identical to those of product 7, and then, during a following blow molding, expanding the parison part-way, excepting its portions corresponding to the root portions 1 or the root and adjacent portions inclusive, of product 7, so as to obtain a desired shape and thickness thereof.

Figure 1B:
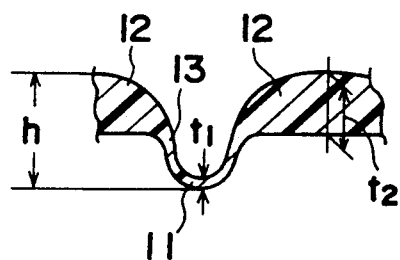
FIG. 1B is an enlarged longitudinally sectional view showing the bellows portion which is a principal portion of the same parison.

By way of example, reference is made to FIGS. 1A and 1B, wherein the injection blow molding process is illustrated in accordance with the invention, showing a longitudinally sectional shape of the parison created. A parison is formed from a thermoplastic resin into a bottomed conical shape, similar to that of product 7 (i.e. boot), and at this point, the conical surface portion 14 of the parison assumes plural different diameters, resulting thus in a bellows configuration. At such diameter-varied part, the parison is formed with root portions 11, crest portions 12 and incline portions 13 therebetween. Since the parison is to be molded into the resulting product 7, it is essential that the pitch among those portions 11, 12 and 13 be respectively equal or close to the corresponding pitch in the product 7. It is particularly important that the thickness $t_1$, shape and dimensions of each root portion 11 (or if required, those of root portion 11 plus its adjacent areas) are substantially identical to those of root portion 1 of product 7. In this connection, in forming those crest and incline portions 12, 13, care is taken to present their respective thicknesses $t_2$, shapes and dimensions, numerically, in a manner allowing for volume variation of those two portions which will occur subject to the subsequent blow molding, to thereby attain a desired final crest and incline portions. For that purpose, the ratio of the parison between the crest and incline portions may be set at 20% to 30%, preferably about 50%, excepting the root portions 11.

Figure 5A:
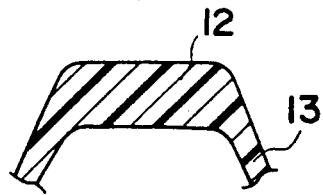
FIGS. 5A to 5D are sectional views showing examples of shapes of each crest portion of a parison.

The illustrated axially-sectional form of crest portions 12 is not limitative. For example, as shown in FIG. 5A, both outer and inner peripheral surfaces of crest portion 12 may be formed flat, or alternatively as in FIG. 5B, the same surfaces may be formed flat and rounded, respectively. These modifications are preferable, because they will make it easier to fabricate corresponding crest portions of an outer mold and/or a core mold used for injection molding and also make it easier to calculate a proper distribution of the parison in terms of weight with respect to each root, crest and incline portions 11, 12, 13. The experiments by the inventor have found that the flat formation of such outer peripheral surface leads to a uniform expansion of the associated crest portions 12 during the blow molding, which is thus effective in profiling the parison in even thickness.

Figure 5B:
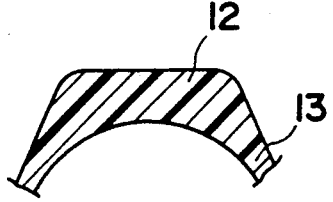
Figure 5C:
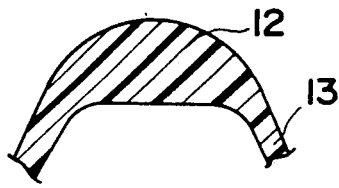
Figure 5D:
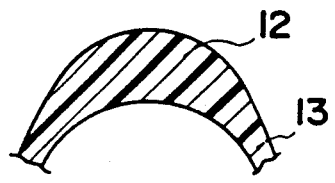
Figure 5E:
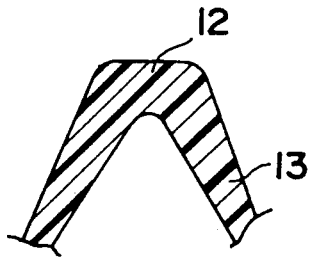
FIGS. 5E to 5I are sectional views showing other examples of shapes of each crest portion of a parison.
Figure 5F:
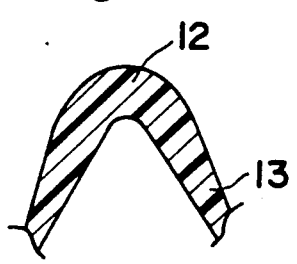
Figure 5G:
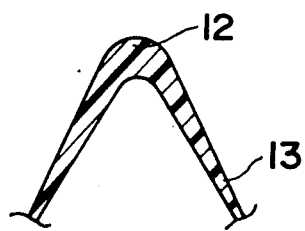
Figure 5H:
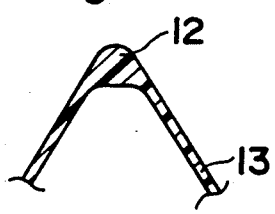
Figure 5I:
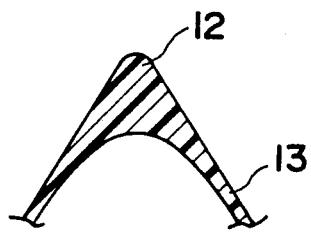

It is preferable that the outer and inner peripheral surface of each of the crest portions 12 is formed into a rounded surface and a flat surface, respectively, as shown in FIG. 5C, or both its outer and inner peripheral surfaces are rounded, as in FIG. 5D. These embodiments are effective in allowing the stress of the parison during blow molding to be distributed evenly, thereby assisting in making its thickness uniform.

Furthermore, referring to FIGS. 5E to 5I, the rounded surface of crest portion 12 may have a radius of curvature smaller than that of the rounded one shown in FIGS. 5A to 5B, or may have small and large radii of curvature in combination, or the whole shape of the crest portion may be triangular.

Figure 3:
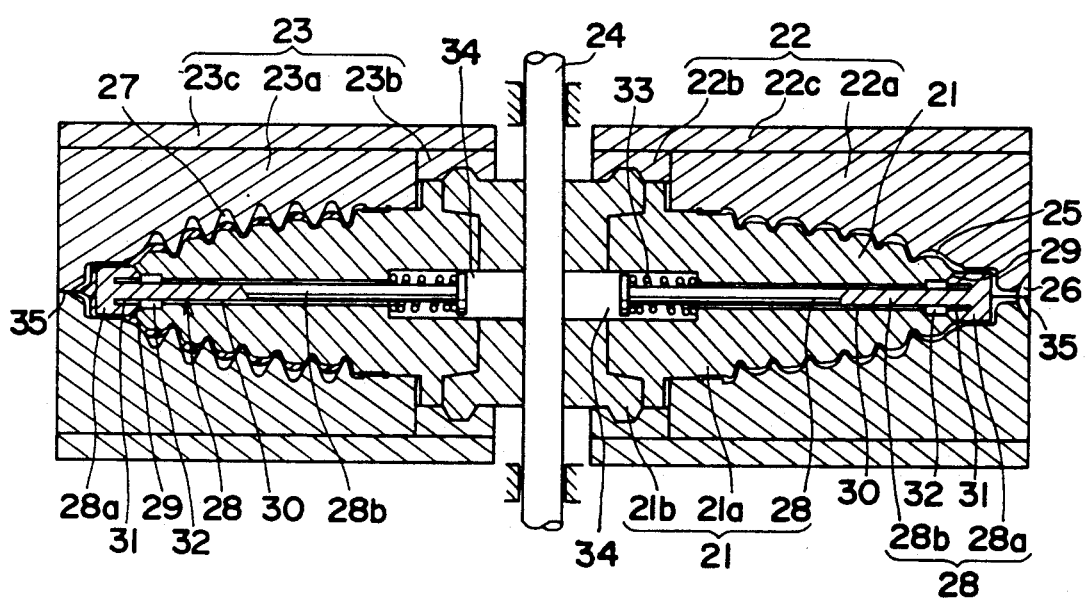
FIG. 3 is a schematic sectional view showing an example of molds used for carrying out the injection blow molding method of the present invention.

FIG. 3 schematically shows an example of injection blow molding molds for carrying out the injection blow molding method to be set forth. The mold illustrated comprises a core mold 21, an injection-molding outer mold 22 adapted for injection molding the parison in the spacing between the core and outer molds 21, 22, and a blow-molding outer mold 23 adapted for blow molding the parison thus formed, the parison being kept affixed over the core mold 21 as can be seen. In the second mold 23, the parison is to be formed into a predetermined shape of product 7. As shown, the injection-molding and blow-molding outer molds 22, 23 are disposed symmetrically relative to the central rotary shaft 24, and the core mold 21 is mounted rotatably on the shaft 24 such as to be turnable thereabout towards either of those two outer molds 22, 23. As the mold per se is known in the art, further specific explanation thereon is deleted for the sake of simplicity in description.

As understandable from FIG. 3, the injection-molding outer mold 22 is of a split mold type comprising a cavity section 22a, a socket section 22b, and a holder section 22c. The cavity section 22a is so dimensioned as to accommodate therein the foregoing core mold 21 and define, in conjuction therewith, a cavity 25 in which the parison 10 is to be injection molded. The socket section 22b is engaged with another socket section 21b of core mold 21, so as to position the core mold 21 precisely with respect to the outer mold 22. The cavity and socket sections 22a, 22b are held together by the holder section 22c. Designation 35 denotes a parting line from which upper and lower halves of the thus-formed outer mold 22 may be separated from each other, so that the cavity and socket sections 22a, 22b are removable from the core mold 21. Although not shown, such separation of split outer mold 22 is carried out by use of a closing cylinder in a manner causing its two halves to be retracted from a locus or path along which the core mold 21 is turned towards either of the injection-molding and blow-molding outer molds 22, 23.

The cavity defined between the outer and core molds 21, 22 should be contoured so as to injection mold the parison at substantially the same thickness, dimensions and shape as those of the corresponding root portions 1 of final product 7. But, if required, the form of cavity 25 may be such as to injection mold the root portions 11 plus adjacent part of the incline portions 13 by generally the same thickness, dimensions and shape as those of corresponding ones 1, 3 of product 7. By contrast, the other portions than those root and adjacent portions are formed into proper thickness, dimensions and shapes which will undergo the subsequent blow molding into the given final product.

At the present injection molding state, it could be possible to mold the parison in the molds 21, 22 so as to make greater a difference (h) in radius between the parison root and crest portions 11, 12 (see FIG. 1B), in consideration of reducing a blow-up ratio of crest portions 12 to the lowest possible level against the root portions 11 for the purpose of attaining the uniform thickness among those two portions 11, 12. However, such molding way make slow or block the flow of resin base material injected into the molds 21, 22. Thus, as can be seen from FIG. 1A or 3, preferably the parison should be injected in the molding cavity 25 such that, in the points of cavity 25 corresponding to the crest portions 12, the parison is distributed in a manner or at a value reducing the radius difference h, thereby providing a more gentle sinuosity (i.e. bellows sinuosity) among the root and crest portions 11, 12 in comparison with that of resultant product 7. This arrangement advantageously permits smooth flow of the parison injected into the cavity 25.

Designation 26 denotes an injecting port provided in the mold 22. Into such port, a nozzle of an injection molding apparatus (not shown) is pressingly fitted, so that a basic material of molten plastics or resin is injected from that injecting port into the cavity 25.

The blow-molding outer mold 23 functions to impinge air to the parison, blowing up and expanding it into a final shape of product 7, while simultaneously cooling and curing the parison to limit its outer contour. The mold 23 is also of a split mold type, comprising a cavity section 23a having, formed therein, a cavity surface conforming to the outer contour of product 7, a socket section 23b and a holder section 23c. Similar to the aforementioned injection-molding mold 22, the socket section 23b is engaged with another socket 21b of core mold 21 for positioning the core mold 21 precisely relative to the outer mold 23, and by means of the holder section 23c, both cavity and socket sections 23a, 23b are held together.

The cavity surface of cavity section 23a is formed such that, at each of the points corresponding to the crest portions 12, the cavity surface per se acts in conjunction with the outer surface of core mold 21 to define a blow hollow 27. The blow hollow 27 is adapted solely for blowing up the crest and incline portions 12, 13 of the parison during the blowing molding stage. It should be noted here that at the other points corresponding to the parison root portions 11, there is no such blow hollow (27), but a clearance between the cavity surface at 23a and core mold 21 is provided which is equal to the thickness of root portions 11, with an allowance for permitting the creation of an air path within the parison, so that in operation, air, with blow pressure, can be forcibly penetrated through the elastic layer of the parison at the root portions 11. Otherwise stated, the root portions 11 are substantially sandwiched between the cavity surface at 23 and core mold 21.

The core mold 21 comprises the foregoing socket section 21b coupled to the rotary shaft 24, a cavity section 21a having a shape similar to that of the parison 10, and an ejector rod 28 which can be ejected from the cavity section 21a in an outward direction from the center at 24, along which direction the final product 7 aught to be removed as well. The socket section 21b functions to locate the core mold 21 properly relative to both the injection-molding and blow-molding outer molds 22, 23. The ejector rod 28 comprises a valve seat portion 28a of a truncated-conical shape which forms an outer distal end of core mold 21, facing the foregoing injecting port 26 of injection-molding outer mold 22, and a bar portion 28b carrying the valve seat portion 28a. The ejector rod 28 is movably received in an air passage 30 extending through a central axis of cavity section 21a, such that the rod 28 is free to be ejected outwardly from the base end of cavity section 21a. Between the valve seat portion 23a and cavity section 21, a juncture is defined, which will act as an air blowout port 29 for allowing or blocking the flow of blow air introduced from the blow molding apparatus as the valve seat portion 23a is moved toward and away from the cavity section 21. In the valve seat portion 28a, a cooling medium flow path 31 is formed, into which is flowed a cooling fluid or air during the blow molding process. The flow path 31 communicates with an air reservoir 32 formed between the bar portion 28b and cavity portion 21a, thereby directing a blow air into such path 31. The cooling medium or cooling fluid in this context is not limited to the blow air for blow molding, but may be a cooling air or liquid exclusively used for cooling the valve portion 28a to facilitate removal of the resultant product from the molds. Designation 34 stands for a blow air introducing bore which communicates with the air passage 30. To such bore 34, although not shown, the above-stated nozzle of blow molding apparatus is connected for supplying a blow air into the cavity section 21a of core mold 21. Further within the bore 34, a return coil spring 33 is disposed in such a manner as to be interposed between the flange of ejector rod bar portion 28b and a stepped wall of bore 34. The spring 33 normally applies a force to the ejector rod 28 in a direction to retract the same towards the rotary shaft 24, thus urging the valve seat portion 28a into contact with an end of core mold cavity section 21a, thereby closing the foregoing air blowout port 29 to block the flow of blow air therethrough. Like the air blowout port 29, although not shown, in the base end part of core mold cavity section 21a on which the mounting portion 15 of parison 10 is affixed, a second air blowout port, which is only opened mechanically in response to a supply of blow air into the cavity section 21a so as to define a slit for allowing flow of the blow air. With this arrangement, the blow air can be simultaneously supplied to the parison from both opposite sides of core mold 21, which advantageously shortens the whole length of time for blow molding in which to completely spread a blow pressure over the entirety of the parison. It is noted that, by virtue of a cooling blow air flowing in the air path 31 of valve seat portion 28a as well as in the area surrounding the first air blowout port 29, the corresponding regions of core mold 21 are cooled so that the tip end part of the parison, especially the mounting portion 16 having smaller diameter, is prevented from being baked and discoloring. Therefore, such cooling is effective in avoiding the baking of those non-blow-molding areas (i.e. the areas of parison created adjacent the injecting port 26) and the discoloring thereof which tends to occur when removing the resultant product from the molds.

Now, a description will be made of specific steps in the present injection blow molding method, as one typical example, using the molds shown in FIG. 3, the parison shown at 10 in FIGS. 4A to 4E and resulting product 7 to be formed thereby.

Figure 4A:
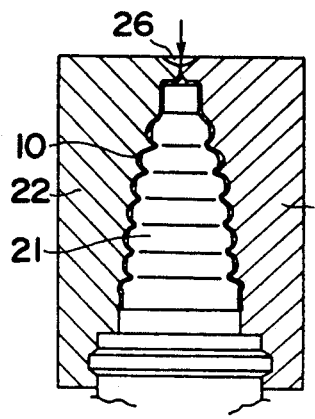
FIGS. 4A to 4E are schematic illustrations showing the molding steps of the injection blow molding method.
Figure 4B:
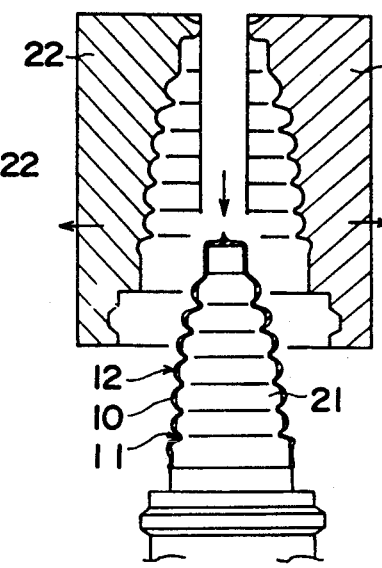
Figure 4C:
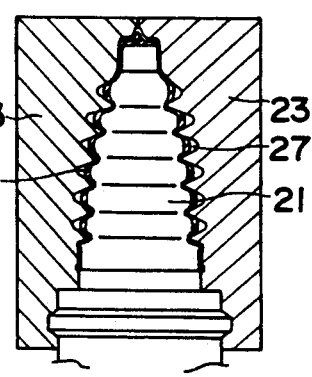
Figure 4D:
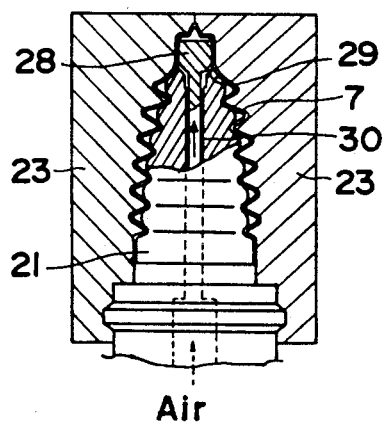

At first, referring to FIG. 4A, into one half of split-type injection-molding outer molds 22, the core mold 21 is placed and then another half of molds 22 is engaged and secured with that one half, so as to provide a closed outer molds 22. A molten base material of synthetic resin is injected from the injecting port 26 into the cavity 25 between the core and outer molds 21, 22. The parison 10 is created and molded in the cavity 25 under the injection molding. At that moment, the parison 10 is being injection molded, with its root portions 11 and adjacent areas being formed in a shape identical or generally identical to that of final product 7, excepting the crest and incline portions 12, 13. During the on-going injection molding process, such latter portions 12, 13 are formed in a condition to undergo the subsequent blow molding process and will be blow molded into the final shapes of product 7. That is, FIGS. 1A and 1B give a good view of the parison 10 being in such injection molding state. Thereafter, the outer molds 22 are separated into the two halfs, and the core mold 21 with the parison 10 thereon is removed from the molds 22, as shown in FIG. 4B. Then, the core mold 21 along with the parison 10 is turned about the shaft 24 towards one half of split-type blow-molding outer molds 23, likewise in the injection-molding molds 22, and placed therein, as in FIG. 4C. Another half of molds 23 is engaged and secured with that one half to provide a closed mold 23, and then as apparent in FIG. 4D, a blow air is supplied from the blow molding apparatus (not shown) into the core mold 21, and the air is flowed through the air passage 30, while pressing the ejector rod against the urging force of the spring in the outward direction. Such movement of ejector rod causes the valve seat portion to be moved away from the tip end of the core mold cavity section, whereupon the air blowout port 29 is opened so as to emit the air into the cavity between the core and outer molds 21, 23 for blowing up the parison 10. In this respect, if required, the not-shown air blowout port at the base end of core mold 21 may be opened.

With the air being blown to the parison 10, its crest and incline portions 12, 13 are blown up easily in contrast to its root portions 11. The reason is, that the root portions 11 have already been formed into a given final shape between the narrow corresponding points of cavity, and the crest and incline portions 12, 13 are thicker than the root portions 11, thus still holding a high heat therein, namely hard to cool, and keeping a high fluidity. As mentioned previously, since the blow air penetrates through the root portions 11, with its blow pressure, owing to the allowance given in the corresponding cavity points between the core and outer molds 21, 23, the blow molding is in no way effected upon the root portions 11. On the contrary, the crest portions 12 and adjacent incline portions 13 are blow molded at the respective great hollows 27 of cavity (see FIG. 3) between the core and outer molds 21, 23. Thus, those two parison portions 12, 13 are expanded or blown up under the blow pressure of air being blown through the entire cavity between the core and outer molds 21, 23 and molded along the cavity surface of outer mold 23, while being cooled and cured at the same time. To carry out this blow molding appropriately, it is at least essential to set a parison ratio of 20% to 80% between the crest and incline portions 12, 13 or preferably about 50%, with this ratio of parison 10, an optimal blow molding can be effected to obtain the resulting product 7 with little variation in thickness or generally uniform thickness. In particular, it is possible to avoid the thickness variation in the root portions of product 7 and reduce a shape irregularity in the same.

Figure 4E:
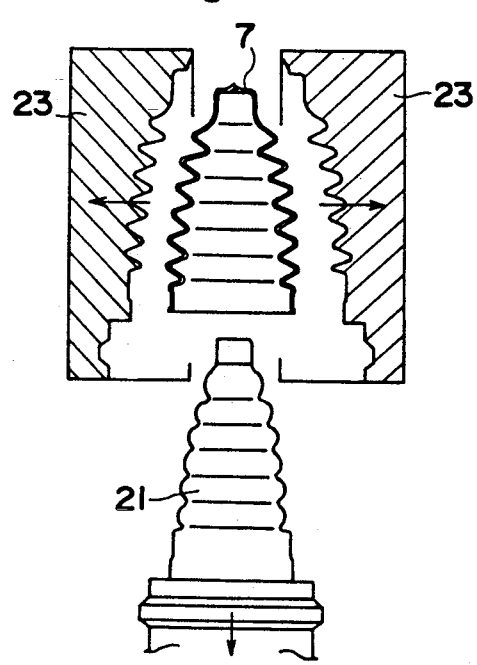

When the parison 10 has been cooled and cured, the blow-molding outer molds 23 are separated into two halves for removal of the product 7 therefrom, as shown in FIG. 4E. At this stage, the removal of product 7 basically consists in applying blow air thereto for its expansion from the core mold 21 and taking out the product quickly. It is to be understood that the foregoing parison ratio (20% to 80% or preferably about 50%) permits such elastic expansion of product 7 for removal from the core mold 21, which guarantees recovery of the product 7 into its original shape, thus not causing an deformation thereof.

Although the above embodiment is only a preferred embodiment of the present invention, the present invention is not limited to this, and various modifications can be made within the scope of the gist of the invention. For example, although the embodiment concerns the constant-velocity joint boot having a conical whole shape as a bellows product, the present invention can be applied to the production of a steering boot having a cylindrical whole shape and other bellows products.

What is claimed is:

1. A method of injection blow molding a synthetic resin bellows product, by which a final bellows product is obtained from a parison of molten synthetic resin material, said final bellows product having plural finally shaped root portions, crest portions and incline portions, wherein each of said root and crest portions has an axially sectional form or a circular arc, and said incline portions are defined between adjacent root and crest portions, said method comprising the steps of:

providing an injection molding mold, a blow molding mold, and a core mold to be used with both of said injection and blow molding molds, said core mold having a cavity surface;

said injection molding mold having a cavity surface which acts in conjunction with said cavity surface of said core mold to define an injection molding cavity therebetween, said cavity surface of said injection molding mold being formed with a plurality of projected portions and said cavity surface of said core mold being formed with a plurality of recessed portions, said injection molding cavity including a plurality of first cavity points which are each defined by said projected portions and said recessed portions respectively, wherein said plurality of first cavity points are in the form of axial sectional arcs and correspond in shape to said plural finally shaped root portions or root portions plus their adjacent areas of said final bellows products;

said blow molding mold having a cavity surface which acts in conjunction with said cavity surface of said core mold to define a blow molding cavity therebetween, said cavity surface of said blow molding mold being formed with a plurality of projected portions at locations corresponding respectively to said recessed portions of said core mold, wherein said blow molding cavity includes a plurality of second cavity points which are in the form of axial sectional arcs and are defined by said projected portions of said blow molding mold and said core mold recessed portions, respectively, said plurality of second cavity points corresponding substantially in shape to the respective said plural finally shaped root portions or root portions plus their adjacent areas of said final bellows product, and wherein said blow molding cavity further includes a plurality of third cavity points defined at locations corresponding respectively to said plural finally shaped crest and incline portions of said final bellows product, said plurality of third cavity points each corresponding in shape to the respective said finally shaped crest and incline portions of said final bellows product;

effecting an injection molding by use of said injection molding mold with said core mold to mold said parison in said injection molding cavity, such that, at said first cavity points, a plurality of parison root portions or parison root portions plus their adjacent areas are formed and shaped substantially identical to those of said finally shaped root portions or root portions plus their adjacent areas of said final bellows product, and between adjacent ones of said first cavity points, a plurality of other parison portions other than said plurality of parison root portions or parison root portions plus their adjacent areas are formed in shapes which are different from those of said finally shaped crest and incline portions of said final bellows product;

and thereafter, effecting a blow molding by use of said blow molding mold and said core mold to blow mold the injection-molded parison, such that, at said third cavity points, said plurality of other parison portions are formed into a plurality of said finally shaped crest and incline portions of said final bellows product, while, during said blow molding, at said second cavity points of said blow molding mold, said injection-molded parison root portions or root portions plus their adjacent areas are held substantially at the same shape as the shape attained therefor during said injection molding, without being subject to said blow molding.

2. A method of injection blow molding a synthetic resin bellows product according to claim 1, wherein said third cavity points between said core and blow molding molds are formed with a slight clearance in relation to the corresponding first cavity points defined in said injection molding, so that blow air is allowed to pass through an elastic layer of said parison at each of said third cavity points, without carrying out blow molding therein.

3. A method of injection blow molding a synthetic resin bellows product according to claim 1, wherein during said blow molding, said crest and incline portions of said parison are blow molded with a ratio of the parison being 20% to 80%.

4. A method of injection blow molding a synthetic resin bellows product according to claim 1, wherein said bellows product has a substantially conical barrel portion in which said crest and root portions are gradually increased in diameter as they proceed to one end of said product.

5. A method of injection blow molding a synthetic resin bellows product according to claim 1, wherein an outer peripheral surface of each of said crest portions of said parison is formed into a plane shape.

6. A method of injection blow molding a synthetic resin bellows product according to claim 1, wherein the outer peripheral surface of each of said crest portions of said parison is formed into a rounded surface shape.

7. A method of injection blow molding a synthetic resin bellows product according to claims 5 or 6, wherein an inner peripheral surface of each of said crest portions of said parison is formed into a plane shape.

8. A method of injection blow molding a synthetic resin bellows product according to claims 5 or 6, wherein the inner peripheral surface of each of said crest portions of said parison is formed into a rounded surface shape.

9. A method of injection blow molding a synthetic resin bellows product according to claim 1, wherein said blow molding cavity has a longitudinal direction extending across the plurality of projected portions of said blow molding mold, the method including directing blow air in the blow molding cavity in the longitudinal direction to pass the blow air into the third cavity points during the blow molding, one after another.

10. A method on injection blow molding a synthetic resin bellows product according to claim 1, wherein said core mold has an air passage therein, and an ejector rod mounted for movement in said air passage and under said parison, and means defining an air blowout port between said core mold and said ejector rod for passing blow air into the parison to simultaneously eject the parison and the ejector rod from the core mold.

11. A method of injection blow molding a synthetic resin bellows product according to claim 3, wherein the ratio of the parison is about 50%.

* * * * *